(12) United States Patent
Hsiao et al.

(10) Patent No.: US 10,093,284 B2
(45) Date of Patent: *Oct. 9, 2018

(54) VEHICLE CAMERA CLEANING SYSTEM

(71) Applicant: THUNDER POWER NEW ENERGY VEHICLE DEVELOPMENT COMPANY LIMITED, Central (HK)

(72) Inventors: Jen-Chieh Hsiao, Taipei (TW); Tai-Te Wu, Taoyuan (TW); Yen-An Chen, Taipei (TW)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/459,641

(22) Filed: Mar. 15, 2017

(65) Prior Publication Data

US 2017/0182981 A1    Jun. 29, 2017

Related U.S. Application Data

(63) Continuation of application No. 14/967,366, filed on Dec. 14, 2015, now Pat. No. 9,604,601, which is a
(Continued)

(51) Int. Cl.
*G03B 17/48* (2006.01)
*B60S 1/56* (2006.01)
(Continued)

(52) U.S. Cl.
CPC .................. *B60S 1/56* (2013.01);
*B08B 3/02* (2013.01); *B08B 3/10* (2013.01);
*B08B 5/02* (2013.01);
(Continued)

(58) Field of Classification Search
USPC ........................................................ 396/429
See application file for complete search history.

(56) References Cited

U.S. PATENT DOCUMENTS

| 4,026,468 A | 5/1977 | Tinder et al. |
| 4,248,383 A | 2/1981 | Savage et al. |

(Continued)

FOREIGN PATENT DOCUMENTS

| CN | 101291834 A | 10/2008 |
| CN | 103448685 A | 12/2013 |

(Continued)

OTHER PUBLICATIONS

Specification U.S. Appl. No. 62/133,991.
(Continued)

*Primary Examiner* — Rodney Fuller
(74) *Attorney, Agent, or Firm* — Kilpatrick Townsend & Stockton LLP

(57) ABSTRACT

Various techniques described herein relate to vehicle camera cleaning systems used for cleaning foreign matter off of a camera lens, including, for example, a water flow nozzle arranged to eject water flow, an air nozzle arranged to eject air, and a central controller used to control the water flow nozzle and air nozzle. In certain embodiments, a plurality of sensing devices are used for sensing the conditions of the camera lens, such as an infrared water drop sensor, a temperature sensor, a camera sensing sensor, and the like. The central controller may determine whether there are water drops, ice, snow, or other foreign matter on the lens based on signals received from the plurality of sensing devices, and may control the air nozzle and the water flow nozzle to clean the camera lens based on the foreign matter present.

14 Claims, 9 Drawing Sheets

Related U.S. Application Data continuation of application No. 14/883,605, filed on Oct. 14, 2015, now Pat. No. 9,539,988.

(60) Provisional application No. 62/150,848, filed on Apr. 22, 2015, provisional application No. 62/133,991, filed on Mar. 16, 2015.

(51) Int. Cl.
| | | |
|---|---|---|
| *B60S 1/52* | (2006.01) | |
| *B08B 5/02* | (2006.01) | |
| *B08B 3/10* | (2006.01) | |
| *B08B 3/02* | (2006.01) | |
| *G02B 27/00* | (2006.01) | |
| *H04N 5/217* | (2011.01) | |

(52) U.S. Cl.
CPC ............ *B60S 1/52* (2013.01); *G02B 27/0006* (2013.01); *H04N 5/2171* (2013.01)

(56) References Cited

U.S. PATENT DOCUMENTS

| | | | |
|---|---|---|---|
| 4,324,363 | A | 4/1982 | Rauen, Jr. |
| 5,115,342 | A | 5/1992 | Rowe et al. |
| 6,766,036 | B1 | 7/2004 | Pryor |
| 7,289,645 | B2 | 10/2007 | Yamamoto et al. |
| 8,625,855 | B2 | 1/2014 | El Dokor |
| 8,818,716 | B1 | 8/2014 | El Dokor et al. |
| 8,983,718 | B2 | 3/2015 | Ricci |
| 9,539,988 | B2 * | 1/2017 | Hsiao .................... B60S 1/0862 |
| 9,547,373 | B2 | 1/2017 | Hsiao et al. |
| 9,586,618 | B2 | 3/2017 | Sham |
| 9,604,601 | B2 * | 3/2017 | Hsiao .................... B60S 1/566 |
| 2002/0005440 | A1 | 1/2002 | Holt et al. |
| 2002/0134857 | A1 | 9/2002 | Zimmer |
| 2003/0155001 | A1 | 8/2003 | Hoetzer et al. |
| 2005/0206511 | A1 | 9/2005 | Heenan et al. |
| 2007/0077541 | A1 | 4/2007 | Champagne et al. |
| 2007/0084484 | A1 | 4/2007 | Porter et al. |
| 2007/0278325 | A1 | 12/2007 | Sato et al. |
| 2008/0116379 | A1 | 5/2008 | Teder |
| 2008/0210780 | A1 | 9/2008 | Discher et al. |
| 2009/0098815 | A1 | 4/2009 | Hotary |
| 2009/0250533 | A1 | 10/2009 | Akiyama et al. |
| 2009/0278915 | A1 | 11/2009 | Kramer et al. |
| 2010/0230991 | A1 | 9/2010 | Fioravanti |
| 2010/0274480 | A1 | 10/2010 | McCall et al. |
| 2011/0031921 | A1 | 2/2011 | Han |
| 2011/0073142 | A1 | 3/2011 | Hattori et al. |
| 2011/0107272 | A1 | 5/2011 | Aguilar |
| 2011/0128543 | A1 | 6/2011 | Choi |
| 2011/0128555 | A1 | 6/2011 | Rotschild et al. |
| 2011/0266375 | A1 | 11/2011 | Ono et al. |
| 2011/0292212 | A1 | 12/2011 | Tanabe et al. |
| 2012/0032899 | A1 | 2/2012 | Waeller et al. |
| 2012/0163657 | A1 | 6/2012 | Shellshear |
| 2012/0266922 | A1 | 10/2012 | Krahn et al. |
| 2012/0274549 | A1 | 11/2012 | Wehling et al. |
| 2013/0092758 | A1 | 4/2013 | Tanaka et al. |
| 2013/0094086 | A1 | 4/2013 | Bochenek |
| 2013/0117963 | A1 | 5/2013 | Liu |
| 2013/0235381 | A1 | 9/2013 | Kroekel et al. |
| 2014/0009615 | A1 | 1/2014 | Kiyohara et al. |
| 2014/0081521 | A1 | 3/2014 | Frojdh et al. |
| 2014/0089864 | A1 | 3/2014 | Cheng et al. |
| 2014/0090673 | A1 | 4/2014 | Atsumi et al. |
| 2014/0121927 | A1 | 5/2014 | Hanita |
| 2014/0145933 | A1 | 5/2014 | Chae et al. |
| 2014/0222253 | A1 | 8/2014 | Siegal et al. |
| 2014/0223384 | A1 | 8/2014 | Graumann |
| 2014/0277936 | A1 | 9/2014 | El Dokor et al. |
| 2014/0282271 | A1 | 9/2014 | Lu et al. |
| 2014/0306826 | A1 | 10/2014 | Ricci |
| 2014/0309849 | A1 | 10/2014 | Ricci |
| 2015/0022664 | A1 | 1/2015 | Pflug et al. |
| 2015/0054933 | A1 | 2/2015 | Wasiek et al. |
| 2015/0138357 | A1 | 5/2015 | Romack et al. |
| 2015/0141043 | A1 | 5/2015 | Abramson et al. |
| 2015/0151722 | A1 | 6/2015 | Gokan et al. |
| 2015/0168174 | A1 | 6/2015 | Abramson et al. |
| 2015/0183406 | A1 | 7/2015 | Tanaka et al. |
| 2015/0203077 | A1 | 7/2015 | Gokan |
| 2015/0314684 | A1 | 11/2015 | Kronberg |
| 2015/0317527 | A1 | 11/2015 | Graumann et al. |
| 2015/0367859 | A1 | 12/2015 | Roth et al. |
| 2016/0001330 | A1 | 1/2016 | Romack et al. |
| 2016/0048725 | A1 | 2/2016 | Holz et al. |
| 2016/0086391 | A1 | 3/2016 | Ricci |
| 2016/0121817 | A1 | 5/2016 | Liu et al. |
| 2016/0272164 | A1 | 9/2016 | Hsiao et al. |
| 2016/0272165 | A1 | 9/2016 | Hsiao et al. |
| 2016/0272242 | A1 | 9/2016 | Sham |
| 2016/0274668 | A1 | 9/2016 | Hsiao et al. |
| 2016/0274669 | A1 | 9/2016 | Hsiao et al. |
| 2017/0080904 | A1 | 3/2017 | Hsiao et al. |

FOREIGN PATENT DOCUMENTS

| | | |
|---|---|---|
| CN | 205632419 U | 10/2016 |
| EP | 1937525 A2 | 7/2008 |
| EP | 2 871 831 A1 | 5/2015 |
| EP | 2949520 A1 | 12/2015 |
| JP | 2007253640 A | 10/2007 |
| KR | 2011/C89604 A | 3/2011 |
| WO | 2014/007294 A1 | 1/2014 |
| WO | 2014/017015 A1 | 1/2014 |

OTHER PUBLICATIONS

Specification U.S. Appl. No. 62/150,848.
European Search Report for EP 16159387 dated Jul. 15, 2016, all pages.
First Office Action with a search report dated Aug. 18, 2017 from the China Patent Office for 2016101434844, 8 pages.
U.S. Appl. No. 15/366,751, filed Dec. 1, 2016, Non-Final Rejection dated Mar. 7, 2017, all pages.
U.S. Appl. No. 15/366,751, filed Dec. 1, 2016, Final Rejection dated Jul. 31, 2017, all pages.
U.S. Appl. No. 14/967,368, filed Dec. 14, 2015, Non-Final Rejection dated Apr. 22, 2016, all pages.
U.S. Appl. No. 14/967,368, filed Dec. 14, 2015, Final Rejection dated Oct. 27, 2016, all pages.
U.S. Appl. No. 14/967,368, filed Dec. 14, 2015, Non-Final Rejection dated Apr. 10, 2017, all pages.
U.S. Appl. No. 14/967,368, filed Dec. 14, 2015, Notice of Allowance dated Aug. 23, 2017, all pages.

* cited by examiner

VEHICLE CAMERA CLEANING SYSTEM

CROSS-REFERENCE TO RELATED APPLICATIONS

The present application is a continuation of U.S. Nonprovisional patent application Ser. No. 14/967,366, filed Dec. 14, 2015, which is a continuation of U.S. Nonprovisional patent application Ser. No. 14/883,605, filed Oct. 14, 2015, which is a non-provisional of and claims priority to U.S. Provisional Patent Application No. 62/133,991, filed Mar. 16, 2015 The present application is also a non-provisional of and claims priority to U.S. Provisional Patent Application No. 62/150,848, filed Apr. 22, 2015. The entire contents of each of which are incorporated herein by reference for all purposes.

FIELD OF THE INVENTION

The present invention relates to the field of manufacturing of electric vehicles, and particularly relates to lens cleaning technology of electric vehicle cameras.

BACKGROUND OF THE INVENTION

Current electric vehicle cameras, for example, backup cameras, do not involve cleaning technology or equipment capable of dealing with camera lens contamination resulting from water drops, dust and even such severe conditions as ice and snow.

BRIEF SUMMARY OF THE INVENTION

In view of the above, the present invention relates to camera cleaning systems, such as camera cleaning systems for vehicles.

Certain aspects of the present invention relate to vehicle camera cleaning systems used for cleaning foreign matters off on a camera lens. In some embodiments, the vehicle camera cleaning system may include a water flow nozzle, for example, arranged near the outer side of the camera lens surface and used for removing the water drops and/or foreign matters on the camera lens through ejected water flow. Additionally or alternatively, the vehicle camera cleaning system may include an air nozzle, for example, arranged near the outer side of the camera lens surface and used for removing water drops and/or the foreign matters on the camera lens through ejected air. One or more controllers, such as central controller having a processing unit with one or more processors, may be used to control the water flow nozzle and the air nozzle.

According to additional aspects described herein, a vehicle camera cleaning system may include one or more sensing devices used for sensing the conditions of the camera lens, for example, an infrared water drop sensor, a temperature sensor, and/or a camera sensing sensor, etc. In such embodiments, the central controller may be used to determine whether there are water drops, ice, snow, and/or other foreign matter on the lens based on signals sensed by the plurality of sensing devices, and to control the air nozzle and the water flow nozzle to clean the camera lens based on the different types of foreign matters detected.

BRIEF DESCRIPTION OF THE DRAWINGS

The present invention will be further described in detail with reference to the accompanying drawings

DETAILED DESCRIPTION

Figure 1:
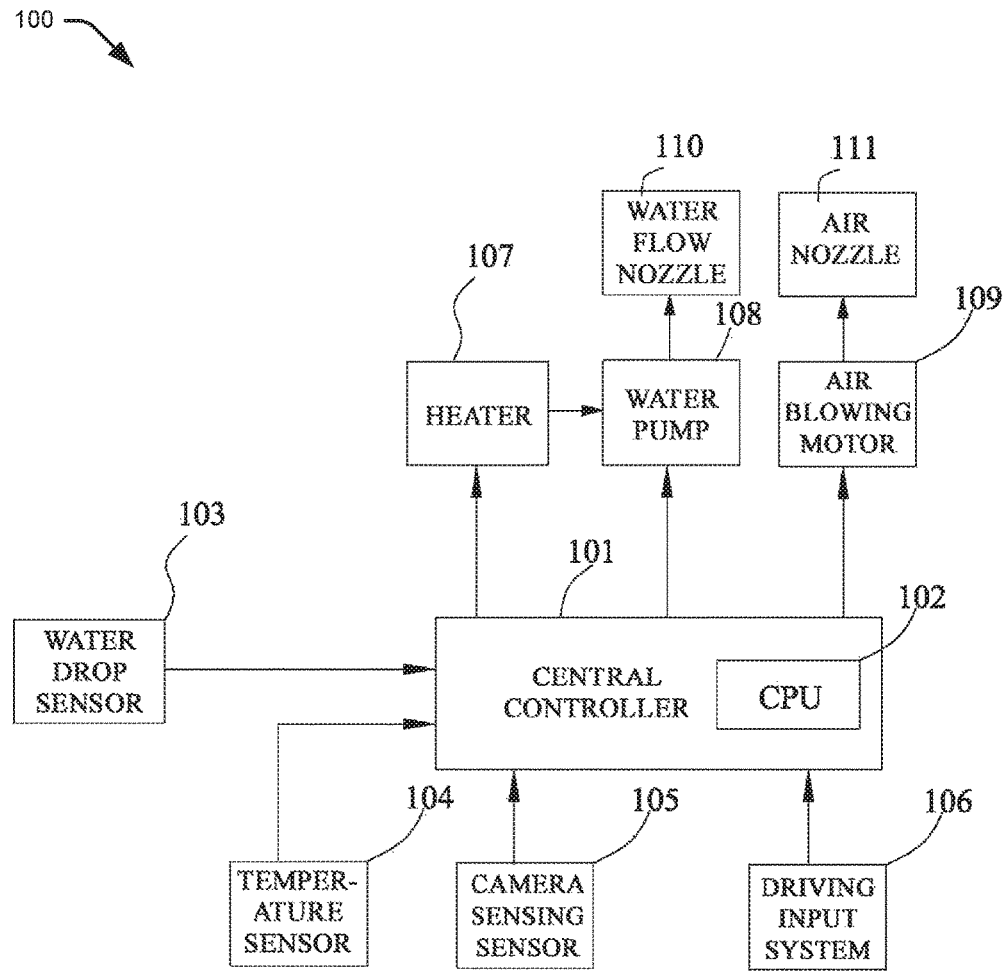
FIG. 1 is a block diagram illustrating the components of a vehicle camera cleaning system, in accordance with one or more embodiments of the present invention.

Embodiments of the vehicle camera cleaning systems of the present invention will be described below with reference to the accompanying drawings.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Various embodiments of the present invention will be described below with reference to the drawings constituting a part of the description. It should be understood that, although terms representing directions are used in the present invention, such as "front", "rear", "upper", "lower", "left", "right", and the like, for describing various exemplary structural parts and elements of the present invention, these terms are used herein only for the purpose of convenience of explanation and are determined based on the exemplary orientations shown in the drawings. Since the embodiments disclosed by the present invention can be arranged according to different directions, these terms representing directions are merely used for illustration and should not be regarded as limitation. Wherever possible, the same or similar reference marks used in the present invention refer to the same components.

The term "computer-readable medium" includes, but is not limited non-transitory media such as portable or fixed storage devices, optical storage devices, and various other mediums capable of storing, containing or carrying instruction(s) and/or data. A code segment or computer-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium. A processor(s) may perform the necessary tasks.

Various techniques (e.g., systems, circuits, methods, non-transitory computer-readable storage memory storing a plurality of instructions executable by one or more processors, etc.) are described herein relating to vehicle camera cleaning systems used for cleaning foreign matter off of a camera lens, including, for example, a water flow nozzle arranged to eject water flow, an air nozzle arranged to eject air, and a central controller used to control the water flow nozzle and air nozzle. In certain embodiments, a plurality of sensing devices are used for sensing the conditions of the camera lens, such as an infrared water drop sensor, a temperature sensor, a camera sensing sensor, and the like. The central controller may determine whether there are water drops, ice, snow, or other foreign matter on the lens based on signals received from the plurality of sensing devices, and may control the air nozzle and the water flow nozzle to clean the camera lens based on the foreign matter present.

Referring now to FIG. 1, a module diagram is shown of a vehicle camera cleaning system in accordance with certain embodiments. As shown in FIG. 1, in various different embodiments a vehicle camera cleaning system may include a central controller 101, a water drop sensor 103, a temperature sensor 104, a foreign matter image sensor 105 (which may also be referred to as a camera sensing sensor), a driving input system 106, a heater 107, a water pump 108, an air blowing motor 109, a water flow nozzle 110, and/or an air nozzle 111. In this example, the central controller 101 may be the core of the system 100, and a CPU 102 and other circuit components and modules (omitted from the figure) may be installed in the central controller, for example, an I/O port, a BUS and the like. The central controller 101 may be connected with the water drop sensor 103, the temperature sensor 104, the foreign matter image sensor 105, and/or the driving input system 106, and may receive data sensed by the above sensors and data or instructions input by the driving input system. The central controller 101 also may be connected to the heater 107, the water pump 108, and/or the air blowing motor 109, and according to the data transmitted by the sensors and the input system, the central controller 101 may determine the contamination state of a camera lens (e.g., by determining whether water drops and/or other foreign matter objects are present on the surface of the camera lens), and transmit control instructions to the heater 107, the water pump 108, and/or the air blowing motor 109 according to different detection signals and different states of the system 100. The heater 107 may be connected to the water pump 108, which may be connected to the water flow nozzle 110. The water pump 108 may eject (or spray) water from the water flow nozzle 110 to clean the camera lens, and the heater 107 may heat the water flow to be ejected. The air blowing motor 109 may be configured to eject (or expel) air stored in a rubber airbag (see FIG. 6A and FIG. 6B) from the air nozzle 111 to clean foreign matter such as water drops and other objects off of the surface of the camera lens.

Figure 2:
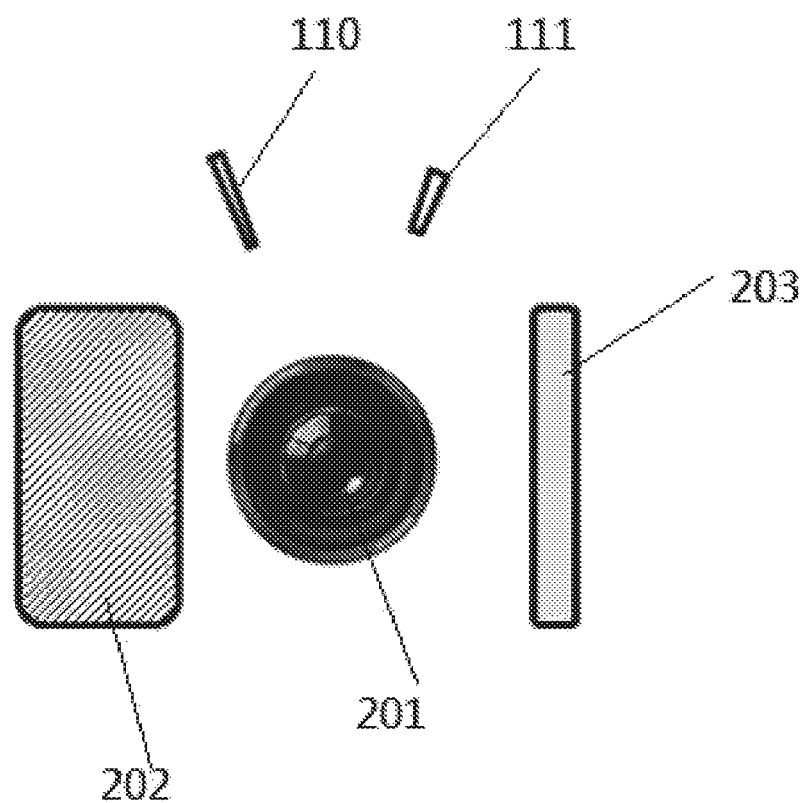
FIG. 2 is a simplified schematic diagram illustrating the physical structures of certain components within a vehicle camera cleaning system, in accordance with one or more embodiments of the present invention.

Referring now to FIG. 2, a schematic diagram is shown including certain physical structures of components in the vehicle camera cleaning system in accordance with certain embodiments. In order to clearly illustrate components in the vehicle camera cleaning system, in FIG. 2, the relative position relationship of the components might not correspond to the actual installation position relationship thereof. As shown in the figure, the two nozzles, namely the water flow nozzle 110 and the air nozzle 111, may be arranged proximate to (or near) the outer side of the vehicle camera lens 201. The outlets of the water flow nozzle 110 and/or the air nozzle 111 may face the vehicle camera lens 201 and may respectively eject high speed water flow and air flow onto the lens, to clean such foreign matters on the lens as water drops, dust, ice and snow and the like. An infrared emitter 202 and an infrared receiver 203 may be arranged on the inner side of the vehicle camera lens 201, and the infrared emitter 202 and the infrared receiver 203 may form the water drop sensor 103 in certain embodiments. Although FIG. 2 shows that the infrared emitter 202 and the infrared receiver 203 are located on the two lateral sides of the camera lens, it should be understood that the purpose of this figure is merely to show the infrared emitter 202 and the infrared receiver 203 to prevent the infrared emitter and the infrared receiver from being shielded by the camera lens in the visual angle of the figure. Thus, in various other embodiments, the infrared emitter 202 and the infrared receiver 203 may be actually arranged on the inner side of the camera lens (e.g., covered by the camera lens), and an example of one potential installation position relationship of the infrared emitter and the infrared receiver with respect to the camera lens may be seen in FIG. 3, discussed below. The vehicle camera cleaning system in this example may further include a foreign matter image sensor 105 used for determining whether there are foreign matters on the lens surface of the camera by judging whether a set of images taken by the vehicle camera is continuous. If the images taken by the camera are discontinuous (or unclear), it may be determined that there are (larger) foreign matters on the camera lens 201. To the contrary, if the images taken by the camera of the foreign matter image sensor 105 are continuous (or clear), then the central controller 101 may determine that there is no foreign matter present on the camera lens.

Figure 3:
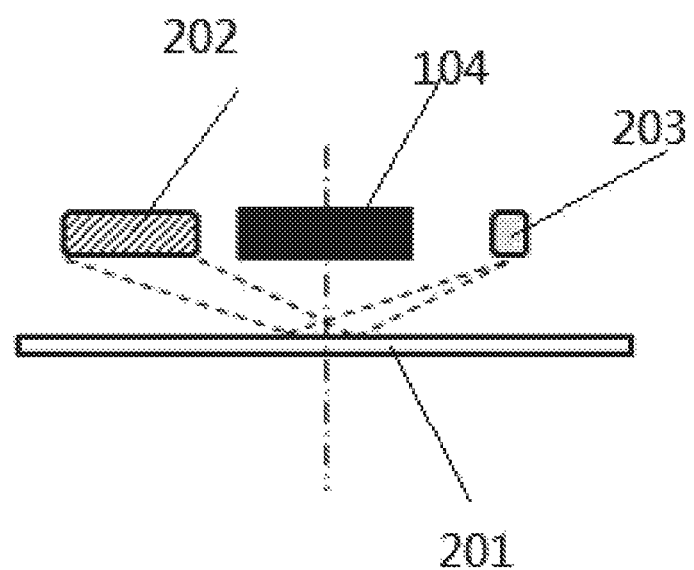
FIG. 3 is a schematic diagram illustrating of a water drop sensor of a vehicle camera cleaning system, in accordance with one or more embodiments of the present invention.

Referring now to FIG. 3, a structural schematic diagram is shown of a water drop sensor in accordance with certain embodiments. As shown in the FIG. 3, an infrared emitter 202 and infrared receiver 203 may be arranged on the inner side of the camera lens 201, whereby the infrared emitter 202 may be used for emitting infrared rays to the camera lens 201, the infrared receiver 203 may be used for receiving infrared rays reflected by the camera lens 201. In some embodiments, the camera lens 201 may be made of high-clarity glass, for example, having a reflectivity on the infrared rays higher than 96% (or even 100% in some cases), but if foreign matter such as water drops, etc., are attached to the glass surface, certain infrared rays may be refracted at the outer side of the camera lens 201, thereby resulting in loss of the reflected infrared rays. Therefore, by calculating the amount of the infrared rays received by the infrared receiver 203, either by the water drop sensor and/or by the central controller 101, the system may determine whether there are water drops attached to the glass surface. Specific reference may be made to FIG. 4A and FIG. 4B.

FIG. 3 further shows the temperature sensor 104, which may be designed and configured to sense the temperature of the camera lens 201, and to transmit a signal to the central controller 101. Such temperature data may be used by the central controller to estimate the environment temperature, in order to determine whether there is a need to use heated water flow to clean the camera lens 201.

Figure 4A:
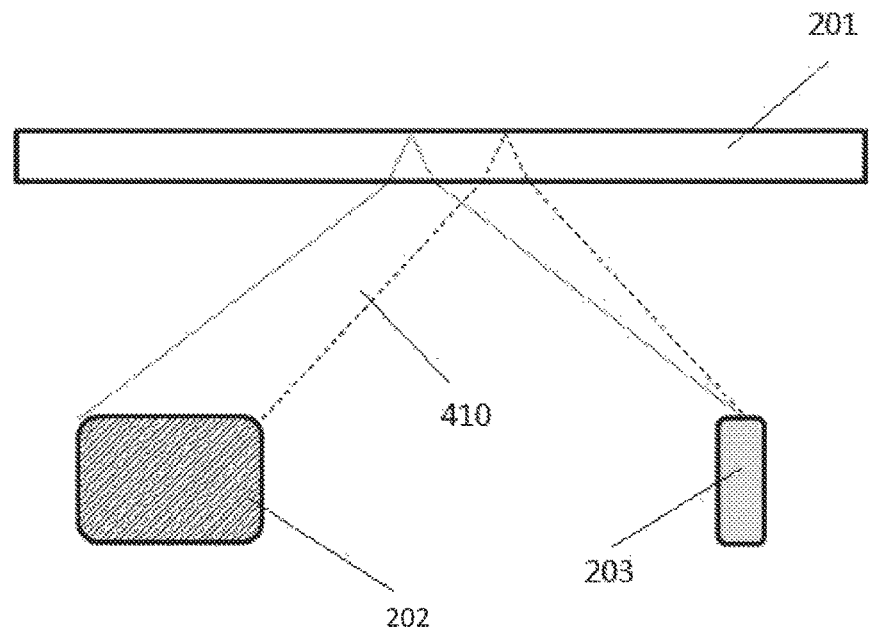
FIGS. 4A and 4B are illustrative working state diagrams for a water drop sensor of a vehicle camera cleaning system, in accordance with one or more embodiments of the present invention.
Figure 4B:
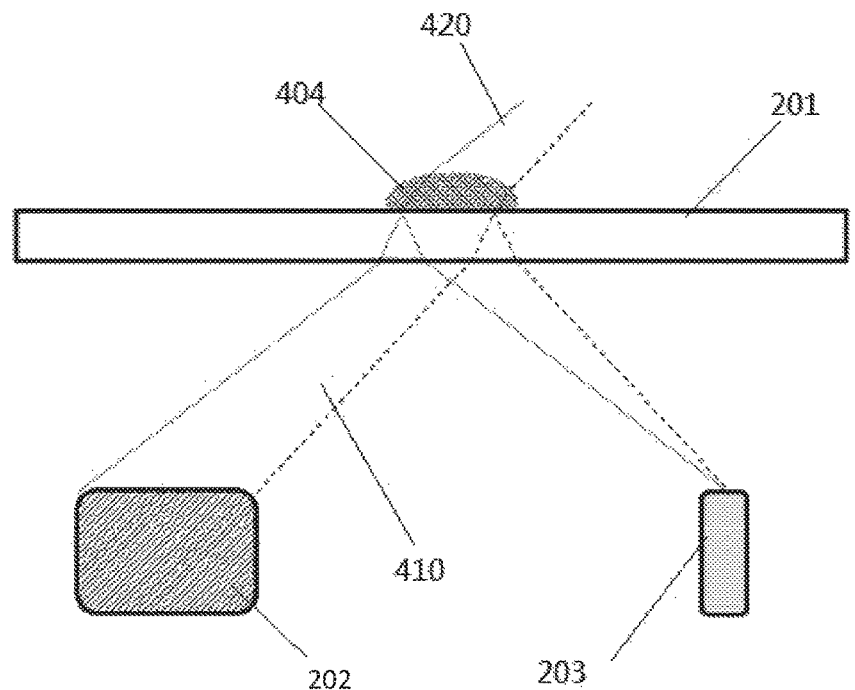

Referring now to FIGS. 4A and 4B, working state diagrams are shown of the water drop sensor in accordance with certain embodiments. In these examples, FIG. 4A corresponds to a scenario where there are no water drops on the camera lens, and FIG. 4B corresponds to a scenario where there are water drops on the camera lens.

As shown in FIG. 4A, the infrared emitter 202 may emits infrared rays 410 onto the camera lens 201, and the infrared receiver 203 may receive the infrared rays 410 reflected by the camera lens 201. If there are no water drops on the outer side of the glass, after the infrared rays are refracted and reflected by the glass, compared with the amount of the infrared rays emitted by the infrared emitter, the amount of the infrared rays received by the infrared receiver may be relatively high, and in some cases may be 100%. To the contrary, if there are water drops on the outer side of the glass, due to the refraction of the water drops, the amount of the infrared rays reflected back to the infrared receiver may be reduced, such that compared with the amount of the infrared rays emitted by the infrared emitter, the amount of the infrared rays received by the infrared receiver may be relatively (e.g., at least lower than 100%), and accordingly it may be determined that there are water drops on the outer side of the camera lens 201, as shown in FIG. 4B.

As shown in FIG. 4B, the infrared emitter 202 may emit the infrared ray beam 410 to the camera lens 201, and the infrared receiver 203 may receive infrared rays 410 reflected by the camera lens 201. In this case, since there are water drops 404 on the outer side of the camera lens 201, the water drops may cause some infrared rays 420 to be refracted, and then, the amount of the infrared rays received by the infrared receiver 203 is less than the amount of the infrared rays emitted by the infrared emitter 202, resulting in loss of some rays. When the amount of the received infrared rays, in comparison with the amount of the emitted infrared rays, is higher than a predetermined threshold (or even 100% in the case of no refraction loss), it may be determined that there are no water drops and/or other foreign matter on the camera lens 201. However, if the received amount is measured to be smaller than the predetermined threshold (e.g., less than 100% or other relatively high threshold), it may be determined that there are water drops and/or other foreign matter on the camera lens 201. In some embodiments, the infrared ray loss caused by water drops of different sizes on the lens 201 may be simulated and measured multiple times for multiple different sizes of water drops, and may be stored by the central controller 101. In such cases, the water drop sensor 103 may be used not only to determine whether there are water drops on the lens according to different loss rates, but also may determine the sizes of the water drops. Using the determined sizes of water drops, the central controller 101 may adjust the amounts of water flow and air respectively ejected from the water flow nozzle 110 and the air nozzle 111 based on the determines sizes of water drops and/or other foreign matter.

Figure 5:
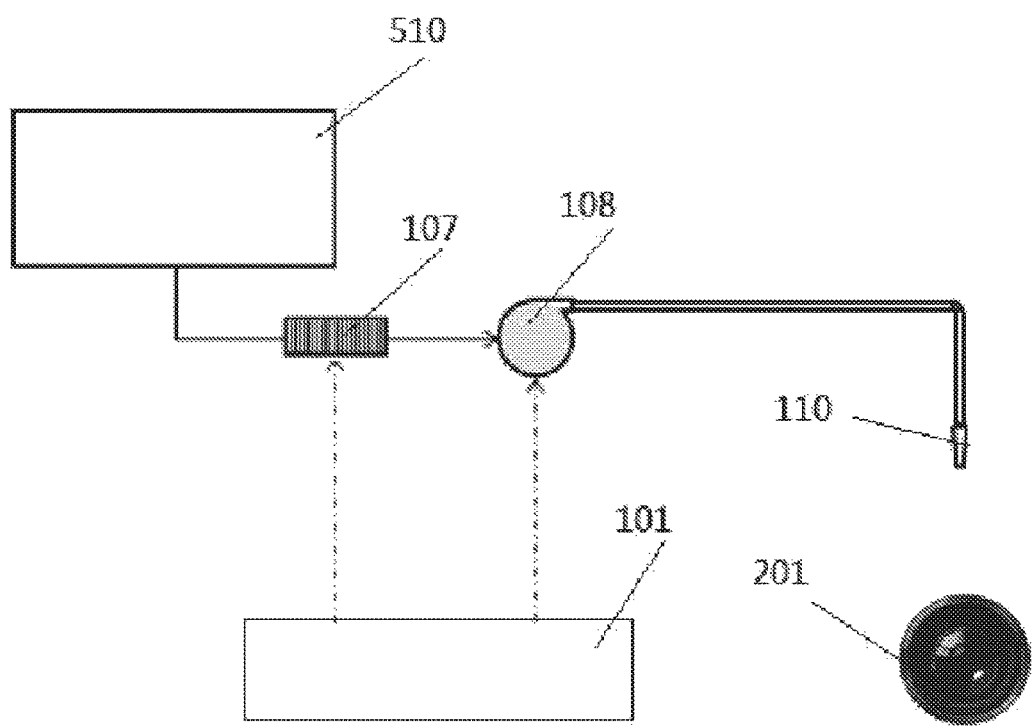
FIG. 5 is a schematic diagram of a water flow nozzle of a vehicle camera cleaning system, in accordance with one or more embodiments of the present invention.

Referring now to FIG. 5, a structural schematic diagram is shown of a water flow nozzle in accordance certain embodiments. As shown in FIG. 5, the water flow nozzle 110 may be connected to a water pump 108, which may be connected to a windshield wiper water tank 510. Water pumped out from the windshield wiper water tank 510 may be ejected from the water flow nozzle 110 to flush the camera lens 201. A heater 107 may be further arranged therein for heating the water flow entering the water pump 108, and the water pump 108 and the heater 107 either may be communicatively connected with the central controller 101 to receive activation and/or deactivation instructions from the central controller 101 to start or stop working. When both the water pump 108 and the heater 107 are activated, heated water may be ejected (e.g., sprayed) from the water flow nozzle 110, which may be used for cleaning frozen ice and snow on the camera lens 201 in winter.

Figure 6A:
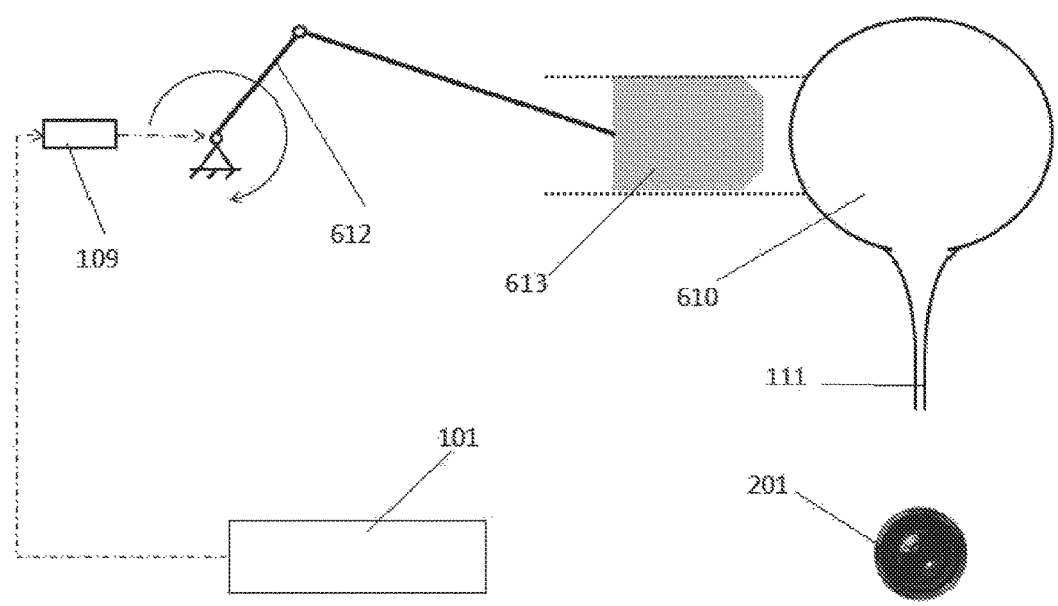
FIGS. 6A and 6B are illustrative working state diagrams for an airbag of a vehicle camera cleaning system, in accordance with one or more embodiments of the present invention.
Figure 6B:
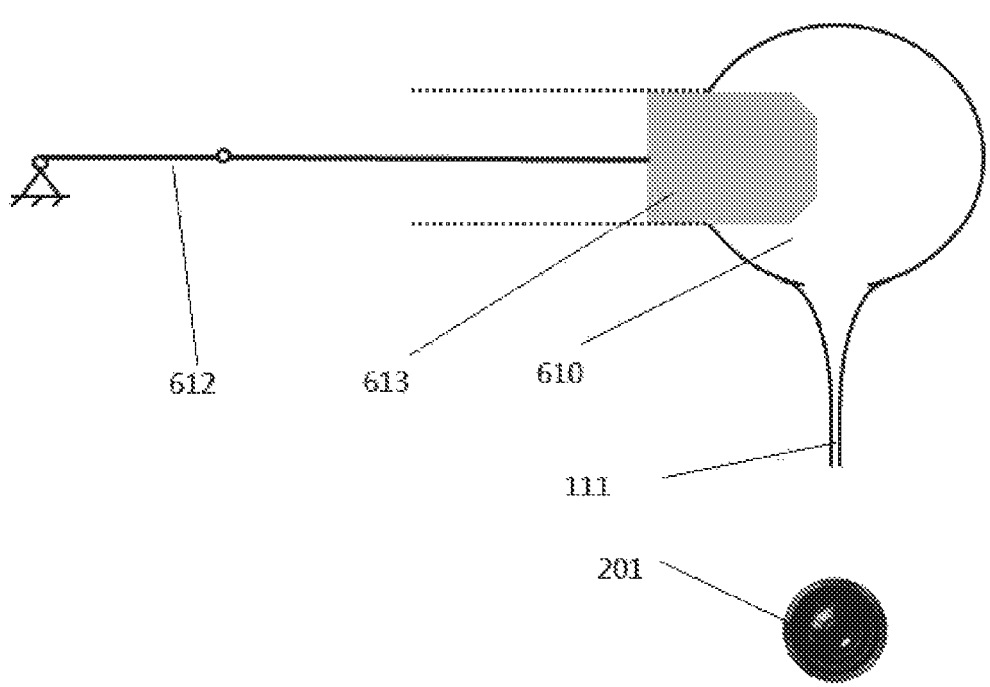

Referring now to FIGS. 6A and 6B, working state diagrams are shown of a rubber airbag in accordance with certain embodiments. In these examples, FIG. 6A corresponds to a scenario where the rubber airbag is not compressed by a piston, and FIG. 6B corresponds to a scenario where the rubber airbag is compressed by a piston.

As shown in FIG. 6A, the air flow nozzle 111 may be just opposite to the camera lens 201. The air flow nozzle 111 may be connected to the rubber airbag 610, which may be made of an elastic material. When the rubber airbag 610 is compressed, the air in the rubber airbag 610 may be ejected (e.g., expelled) from the air flow nozzle 111 to blow away such foreign matters as water drops or dust on the camera lens 201. The speed at which the rubber airbag 610 may determine the speed at which the air is expelled onto the camera lens 201, and thus a rapid compression may be advantageous in some cases to produce a more forceful ejection/discharge of air on the camera lens 201. When the compression force is withdrawn, the rubber airbag 610 may recover to the expansion state to take in air for preparing for next ejection of high speed air flow. In some embodiments, the rubber airbag 610 may be connected to a piston 613, such that when the piston 613 moves towards the rubber airbag 610, the piston may press the rubber airbag 610. The piston 613 may be connected with a crank 612, and the crank 612 may be driven by the air blowing motor 109 to rotate, so that the crank 612 may drive the piston 613 to move back and forth. The air blowing motor 109 may be connected with the central controller 101 and configured to receive activation and/or deactivation signals, so that it may start when receiving the instruction of the central controller 101, thereby driving the piston 613 to compress the rubber airbag 610 and thus to quickly eject air from the air flow nozzle 111, as shown in FIG. 6B.

As shown in FIG. 6B, when the central controller 101 determines that some foreign matter (e.g., water drops, dust, snow, ice, etc.) may be attached to the camera lens 201, and thus there is a need to start the air flow nozzle 111, the central controller 101 may send a starting instruction (can be starting current) to the air blowing motor 109. Thus, the air blowing motor 109 may drive the crank 612, thereby driving the piston 613 to compress the rubber airbag 610, so as to eject air from the air flow nozzle 111.

Figure 7:
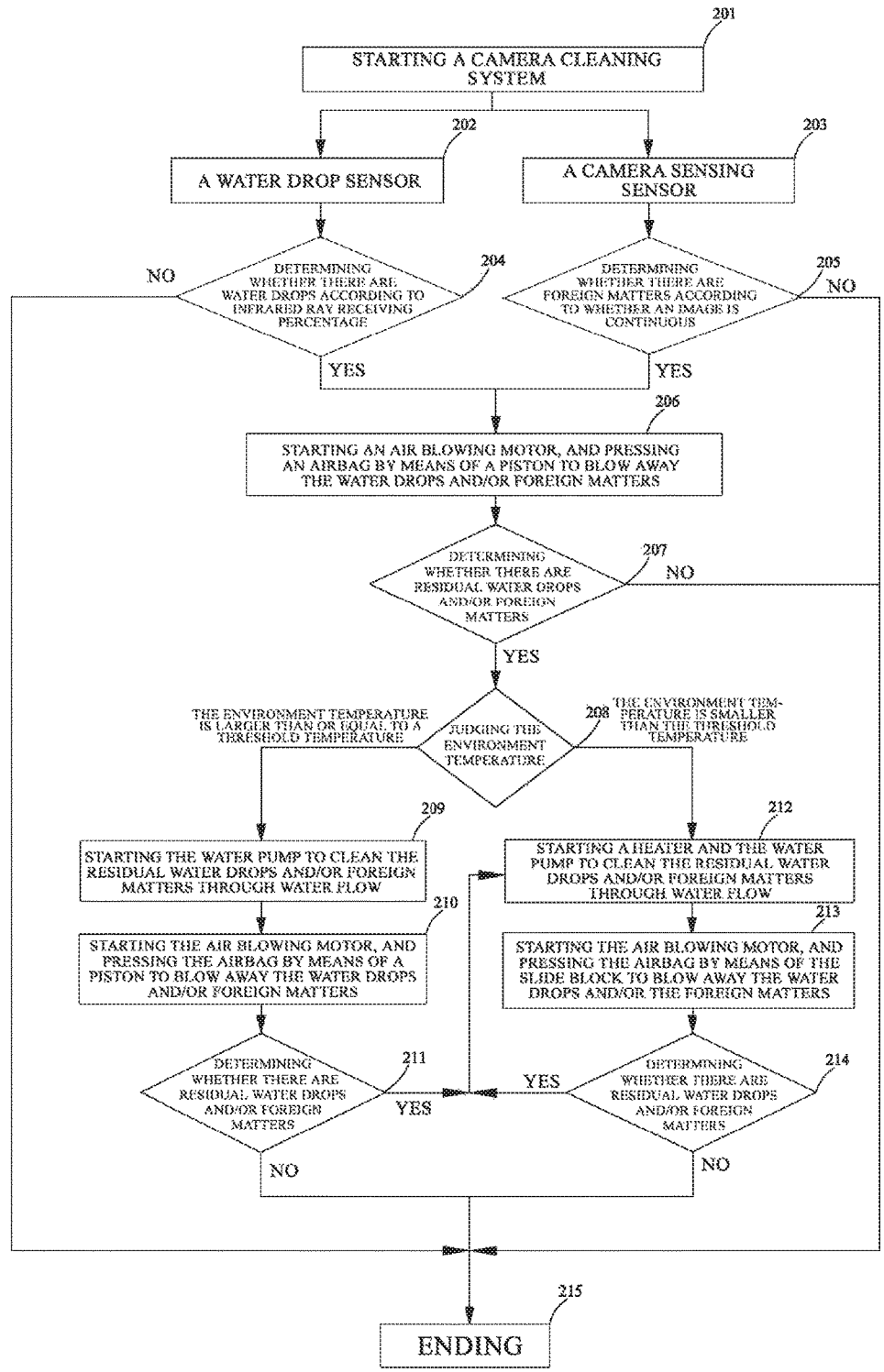
FIG. 7 is a flow diagram illustrating one or more processes of operating a vehicle camera cleaning system, in accordance with one or more embodiments of the present invention.

Referring now to FIG. 7, a flow diagram is shown illustrating an example process of operating a vehicle camera cleaning system, in accordance with certain embodiments. In step 201, a driver may send an instruction to the central controller 101 through the driving input system 106, to start the vehicle camera cleaning system. In step 202, the water drop sensor 103 may be activated, and step 203, the foreign matter image sensor 105 may be activated.

In step 204, the central controller 101 may receive one or more detection signals sent by the water drop sensor 103. If the central controller 101 determines that the amount of the received infrared rays in comparison with the amount of the emitted infrared rays is smaller than a set percentage (for example, smaller than 98%, 99%, 100%, or another threshold percentage value), then it may determine that there are water drops on the camera lens 201 and thus may enter step 206. To the contrary, if the central controller 101 determines that the amount of the received infrared rays in comparison with the amount of the emitted infrared rays is substantially equal to or greater than the set threshold percentage, then it may determine that there are no water drops on the camera lens 201 and may end the operation.

In step 205, the central controller 101 may receive a detection signal sent by the foreign matter image sensor 105. If the detection signal indicates that an image (or set of images) taken by one or more cameras of the sensor 105 is discontinuous, then the central controller 101 may determine that foreign matter is present on the camera lens 201, and may enter step 206. To the contrary, if the detection signal indicates that the image (or set of images) taken by the camera is continuous, then the central controller 101 may determine that there are no foreign matters on the camera lens 201 and may end the operation. In some cases, a single image may be evaluated for continuity by comparing portions of the image to adjacent portions of the image, thereby determining whether the image is a uniform image of the camera lens. In other cases, multiple images taken at different times may be compared to one another to evaluate continuity over time. For example, a recent image taken of the camera lens 201 may be compared to a previous image of the same camera lens 201 taken from the same angel, to determine if new foreign matter is now present on the camera lens 201 that was not present in the earlier image.

In step 206, if it is determined in step 204 that there are water drops on the camera lens 201, and/or if it is determined in step 205 that there is foreign matter on the camera lens 201, then central controller 101 may control the air blowing motor 109 to start, causing the piston 613 to compresses the rubber airbag 610, and the air nozzle 111 to ejects air to blow away the water drops and/or other foreign matter. When step 206 is completed, general light and small water drops or foreign matters on the camera lens 201 may be cleaned.

In step 207, after step 206 is performed, steps 202 to 205 may be repeated in some embodiments, in order to determine whether there are residual water drops and/or foreign matters on the camera lens 201 even after activating the air blowing motor 109. If not, the operation may be ended. If so, step 208 may be is executed, as described below.

In step 208, the temperature sensor 104 may sense the environment temperature of the camera lens 201. If the central controller 101 determines that the environment temperature is larger than or equal to a preset threshold temperature, then step 209 may be executed. If the environment temperature is smaller than the threshold temperature, then step 212 may be executed. Different threshold temperatures may be used under different conditions. For example, a threshold temperature may be 0° C., because when the environment temperature is smaller than 0° C., water drops on the camera lens surface 201 may freeze.

In step 209, the central controller 101 may start the water pump 108 to enable the water flow nozzle 110 to eject high-speed water to clean the residual water drops and/or foreign matters on the camera lens 201.

In step 210, after step 209 is performed, the central controller 101 may start the air blowing motor 109, causing the air nozzle 111 to again expel air to blow away the residual water drops and/or foreign matters.

In step 211, after step 210 is carried out, steps 202 to 205 may be repeated again, to determine whether there are residual water drops and/or foreign matters on the camera lens 201 even after activating the water pump 108 and once again activating air blowing motor 109. If not, the operation is ended. If so, then step 212 may be executed.

In step 212, the central controller 101 may start the heater and the water pump 108, thus causing the water flow nozzle 110 to eject high-speed heated water to clean the residual water drops and/or foreign matter on the camera lens 201. This step may be carried out under the condition that if thicker ice and snow cover on the camera lens 201 in cold winter, and the ice and snow may need to be thawed by the heated water flow.

In step 213, after the step 212 is performed, the central controller 101 may once again start the air blowing motor 109, causing the air nozzle 111 to expel air to blow away the residual water drops and/or foreign matters. In some embodiments, the air nozzle 111 may be used for blowing away the residual water drops after each water flow cleaning, so that the camera lens 201 may be completely cleaned.

In step 214, after step 213 is performed, steps 202 to 205 may be repeated to determine whether there are residual water drops and/or foreign matter on the camera lens 201. If not, the operation may be ended. If so, then steps 212 to 214 may be repeated until there are no residual water drops and/or foreign matter on the camera lens 201.

Figure 8:
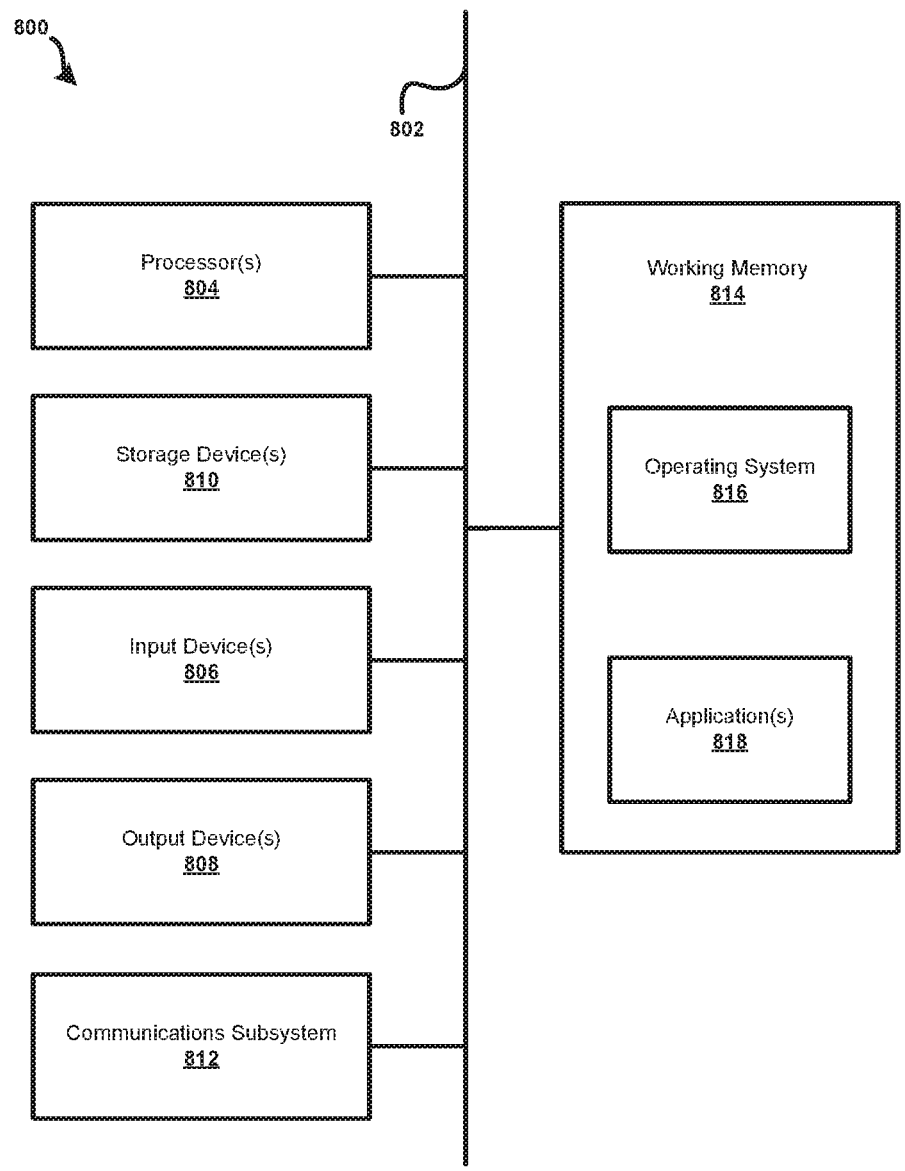
FIG. 8 is an example block diagram for a computing system upon which various features of the present disclosure may be provided.

Referring now to FIG. 8, an example block diagram for a computer system or other computer device 800 which may be integrated into and/or operatively connected to the vehicle camera cleaning system 100 as described herein, as well as any other components or subcomponents described above. One or more computer systems or other computer devices 800 may control one or more aspects of the electric devices and/or components described above. For example, one or more computer devices 800 may be used to implement the central controller 101, as well as the individual sensors 103-105 and other components 107-111. Accordingly, any or all of these components may include some or all of the features described below in reference to computer device 800. In some examples, the computer system or other computer devices 800 may include a tablet computer, personal data assistant, smartphone, gaming console, and/or a dedicated computer system for controlling the electric vehicle. Any particular one of the previously-described computing devices may be wholly or at least partially configured to exhibit features similar to the computer system 800.

The computer device 800 is shown comprising hardware elements that may be electrically coupled via a bus 802 (or may otherwise be in communication, as appropriate). The hardware elements may include a processing unit with one or more processors 804, including without limitation one or more general-purpose processors and/or one or more special-purpose processors (such as digital signal processing chips, graphics acceleration processors, and/or the like); one or more input devices 806, which may include without limitation a steering wheel, a climate control button or other user input receiving buttons, and/or the like; and one or more output devices 808, which may include without limitation a presentation device (e.g., a computer screen), a GPS, and/or the like.

The computer system 800 may further include (and/or be in communication with) one or more non-transitory storage devices 810, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 800 might also include a communications subsystem 812, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 812 may permit data to be exchanged with a network (such as the network described below, to name one example), other computer systems, and/or any other devices described herein. In many embodiments, the computer system 800 will further comprise a working memory 814, which may include a random access memory and/or a read-only memory device, as described above.

The computer device 800 also may comprise software elements, shown as being currently located within the working memory 814, including an operating system 816, device drivers, executable libraries, and/or other code, such as one or more application programs 818, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 810 described above. In some cases, the storage medium might be incorporated within a computer system, such as computer system 800. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 800) to perform methods in accordance with various embodiments of the disclosure. According to a set of embodiments, some or all of the procedures of such methods are performed by the computer system 800 in response to processor 804 executing one or more sequences of one or more instructions (which might be incorporated into the operating system 816 and/or other code, such as an application program 818) contained in the working memory 814. Such instructions may be read into the working memory 814 from another computer-readable medium, such as one or more of the storage device(s) 810. Merely by way of example, execution of the sequences of instructions contained in the working memory 814 may cause the processor(s) 804 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 800, various computer-readable media might be involved in providing instructions/code to processor(s) 804 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 810. Volatile media may include, without limitation, dynamic memory, such as the working memory 814.

Example forms of physical and/or tangible computer-readable media may include a floppy disk, a flexible disk, hard disk, magnetic tape, or any other magnetic medium, a compact disc, any other optical medium, ROM, RAM, and etc., any other memory chip or cartridge, or any other medium from which a computer may read instructions and/or code. Various forms of computer-readable media may be involved in carrying one or more sequences of one or more instructions to the processor(s) 804 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 812 (and/or components thereof) generally will receive signals, and the bus 802 then might carry the signals (and/or the data, instructions, etc. carried by the signals) to the working memory 814, from which the processor(s) 804 retrieves and executes the instructions. The instructions received by the working memory 814 may optionally be stored on a non-transitory storage device 810 either before or after execution by the processor(s) 804.

It should further be understood that the components of computer device 800 can be distributed across a network. For example, some processing may be performed in one location using a first processor while other processing may be performed by another processor remote from the first processor. Other components of computer system 800 may be similarly distributed. As such, computer device 800 may be interpreted as a distributed computing system that performs processing in multiple locations. In some instances, computer system 800 may be interpreted as a single computing device, such as a distinct laptop, desktop computer, or the like, depending on the context.

Examples of Certain Embodiments

In a first example embodiment, a vehicle camera cleaning system for cleaning water drops and/or foreign matters on a vehicle camera lens (201), may comprise: a water flow nozzle (110), arranged near the outer side of the camera lens (201) and used for removing the water drops and/or foreign matters on the camera lens surface (201) through ejected water flow; an air nozzle (111), arranged near the outer side of the camera lens (201) and used for removing the water drops and/or foreign matters on the camera lens (201) through ejected air; and a central controller (101), used for controlling the water flow nozzle (110) and the air nozzle (111) to start working.

A second example embodiment may include the vehicle camera cleaning system of the first example embodiment, further comprising: a water drop sensor (103), the water drop sensor (103) is communicatively connected with the central controller (101) for starting working under the control of the central controller (101) so as to sense whether there are water drops on the camera lens (201) and send a sensing signal to the central controller (101); and camera sensing sensor (105), the camera sensing sensor (105) is communicatively connected with the central controller (101) for starting working under the control of the central controller (101) so as to sense whether there are foreign matters on the camera lens (201) and send a sensing signal to the central controller (101).

A third example embodiment may include the vehicle camera cleaning system of the second example embodiment, wherein the water drop sensor (103) is arranged at the inner side of the camera lens (201).

A fourth example embodiment may include the vehicle camera cleaning system of the third example embodiment, wherein the water drop sensor (103) comprises an infrared emitter (202) and an infrared receiver (203), the infrared emitter (202) is used for emitting infrared rays to the camera lens (201), and the infrared receiver (203) is used for receiving infrared rays reflected by the camera lens (201), so that whether there are water drops on the camera lens (201) can be determined according to the percentage of the amount of the received infrared rays in comparison with the amount of the emitted infrared rays.

A fifth example embodiment may include the vehicle camera cleaning system of the second example embodiment, wherein the camera sensing sensor (105) determines whether there are foreign matters on the camera lens (201) according to whether an image taken by the camera is continuous.

A sixth example embodiment may include the vehicle camera cleaning system of the second example embodiment, further comprising: a temperature sensor (104), the temperature sensor (104) is communicatively connected with the central controller (101) for starting working under the control of the central controller (101) so as to sense the environment temperature of the camera lens (201) and send a sensing signal to the central controller (101).

A seventh example embodiment may include the vehicle camera cleaning system of the second example embodiment, further comprising: a rubber airbag (610), wherein the air nozzle (111) is connected to the rubber airbag (610), and when the rubber airbag (610) is quickly pressed, the air in the rubber airbag (610) is quickly ejected out from the air nozzle (111).

An eighth example embodiment may include the vehicle camera cleaning system of the seventh example embodiment, further comprising: an air blowing motor (109), the air blowing motor (109) is connected with a crank (612), the other end of the crank (612) is connected with a piston (613), and the piston (613) can press the rubber airbag (610), wherein the air blowing motor (109) is communicatively connected with the central controller (101) for starting working under the control of the central controller (101) so as to drive the crank to rotate and drive the piston (613) to move back and forth to enable the piston (613) to press or release the rubber airbag (610) to eject or suck in air, thereby removing the water drops and/or foreign matters on the camera lens (201).

A ninth example embodiment may include the vehicle camera cleaning system of the second or the sixth example embodiments, further comprising: a water pump (108) and a windshield wiper water tank (510), wherein the water pump (108) is connected with the water flow nozzle (110), wherein the water pump (108) is communicatively connected with the central controller (101) for starting working under the control of the central controller (101) so as to pump water flow from the windshield wiper water tank (510) and eject the water flow from the water flow nozzle (110), thereby removing the water drops and/or foreign matters on the camera lens (201).

A tenth example embodiment may include the vehicle camera cleaning system of the ninth example embodiment, further comprising: a heater (107) for selectively heating water flow flowing through the water flow nozzle (110).

An eleventh example embodiment may include the vehicle camera cleaning system of the tenth example embodiment, wherein if the central controller (101) judges that the environment temperature of the camera lens sensed by the temperature sensor (104) is lower than a preset temperature threshold, the central controller (101) controls the heater (107) to start working to heat the water flow flowing through the water flow nozzle (110).

A twelfth example embodiment may include the vehicle camera cleaning system of the tenth example embodiment, wherein the following execution steps are stored in and performed by the central controller (101): step (201): the vehicle camera cleaning system is started; step (202): the water drop sensor (103) starts working; step (203): the camera sensing sensor (105) starts working; step (204): the central controller (101) receives a sensing signal sent by the water drop sensor (103) in step (202), and if the central controller (101) judges that the amount of the received infrared rays in comparison with the amount of the emitted infrared rays is smaller than a set percentage, it determines that there are water drops on the camera lens (201) and enters step (206), and if the central controller (101) judges that the amount of the received infrared rays in comparison with the amount of the emitted infrared rays is substantially equal to the set percentage, then it determines that there are no water drops on the camera lens (201) and ends the operation; step (205): the central controller (101) receives a sensing signal sent by the camera sensing sensor (105) in step (203), and if the central controller (101) judges that the image is discontinuous, it determines that there are foreign matters on the camera lens (201) and enters step (206), and if the central controller (101) judges that the image taken by the camera is continuous, it determines that there are no foreign matters on the camera lens (201) and ends the operation; and step (206): if it is determined in step (204) that there are water drops on the camera lens (201) and/or in step (205) that there are foreign matters on the camera lens (201), the central controller (101) controls the air blowing motor (109) to start, the piston (613) presses the rubber airbag (610), and the air nozzle (111) ejects air to blow away the water drops and/or the foreign matters.

A thirteenth example embodiment may include the vehicle camera cleaning system of the twelfth example embodiment, wherein the following execution steps are further stored in and performed by the central controller (101): step (207): after the step (206) is carried out, step (202) to step (205) are repeated to determine whether there are residual water drops and/or foreign matters on the camera lens (201); if not, the operation is ended; if yes, step (208) is executed; step (208): the temperature sensor (104) senses the environment temperature of the camera lens (201), if the central controller (101) judges that the environment temperature is higher than or equal to a threshold temperature, step (209) is executed; if the environment temperature is lower than the threshold temperature, step (212) is executed; step (209): the central controller (101) starts the water pump (108), and the water flow nozzle (110) ejects high speed water flow to clean the residual water drops and/or foreign matters on the camera lens surface (201); step (210): after the step (209) is carried out, the central controller (101) starts the air blowing motor (109), and the air nozzle (111) ejects air to blow away the residual water drops and/or foreign matters; step (211): after the step (210) is carried out, step (202) to step (205) are repeated to determine whether there are residual water drops and/or foreign matters on the camera lens (201); if not, the operation is ended; if yes, step (212) is executed; step (212): the central controller (101) starts the heater (107) and the water pump (108), and the water flow nozzle (110) ejects high speed heated water flow to clean the residual water drops and/or foreign matters on the camera lens (201); step (213): after the step (212) is carried out, the central controller (101) starts the air blowing motor (109), and the air nozzle (111) ejects air to blow away the residual water drops and/or foreign matters; step (214): after the step (213) is carried out, step (202) to step (205) are repeated to determine whether there are residual water drops and/or foreign matters on the camera lens (201); if not, the operation is ended; if yes, step (212) to step (214) are repeated until there are no residual water drop and/or foreign matter on the camera lens (201).

Although the present invention has been described with reference to the specific embodiments shown in the drawings, it should be understood that the charging system and the charging method provided by the present invention can have a variety of variations without departing from the spirit, scope and background of the present invention. Those of ordinary skill in the art should be still aware that, parameters in the embodiments disclosed by the present invention can be changed in different manners, and these changes shall fall within the spirit and scope of the present invention and the claims.

What is claimed is:

1. A vehicle camera cleaning system, comprising:
   an air-emitting device arranged proximate to a camera lens of the camera cleaning system, the air-emitting device being configured to emit air onto a camera lens of a vehicle camera;
   a water drop sensor configured to generate water drop information based on an amount of infrared rays received by the water drop sensor, the infrared rays being reflected the by the camera lens;
   a processing device including one or more processors configured to:
      receive water drop information from the water drop sensor;
      determine whether there are water drops on the camera lens based on the water drop information; and
      in response to determining there are water drops on the camera lens, generate an instruction to activate the dispersion device to remove the water drops.

2. The vehicle camera cleaning system of claim 1, further comprising:
   a foreign matter image sensor comprising a sensor camera, wherein the foreign matter image sensor is configured to generating foreign matter information indicating foreign matter being detected on the camera lens; and, wherein
   the processing device is further configured such that the determination whether there are water drops on the camera lens is further based on foreign matter information.

3. The vehicle camera cleaning system of claim 2, wherein the water drop sensor is arranged on the inner side of the camera lens.

4. The vehicle camera cleaning system of claim 3, wherein the water drop sensor comprises a infrared receiver configured to receive the infrared rays and an infrared transmitter configured to transmit infrared rays; and
   the water drop sensor information is generated by comparing the amount of infrared rays received by the infrared receiver in comparison to an amount of the infrared rays emitted by the infrared transmitter.

5. The vehicle camera cleaning system of claim 2, wherein the foreign matter image sensor is configured to detect foreign matter on the camera lens based on a determination of whether a set of images captured by the sensor camera is continuous.

6. The vehicle camera cleaning system of claim 1, further comprising:
   a heater configured to heat a water flow;
   a temperature sensor, the temperature sensor being configured to generate environment temperature information indicating an environment temperature of the camera lens; and wherein the processing device is further configured to:
  determine whether the environment temperature is lower than a threshold temperature value in response to receiving the environment temperate information; and
  generate an activation instruction to activate the heater in response to determining the environment temperature is lower than a threshold temperature value.

7. The vehicle camera cleaning system of claim 1, further comprising:
  a rubber airbag connected to the dispersion device, such that when the rubber airbag is compressed, air is expelled by the dispersion device.

8. The vehicle camera cleaning system of claim 7, further comprising:
  an air blowing motor connected to a first end of a crank, wherein a second end of the crank is connected to a piston configured to compress the rubber airbag,
  wherein the air blowing motor is configured to receive activation instructions from the processing device, and wherein upon activation the air blowing motor is configured to drive rotation of the crank, thereby driving the piston back and forth to enable the piston to compress and release the rubber airbag to expel or take in air.

9. The vehicle camera cleaning system of claim 1, further comprising:
  a heater configured to receive activation instructions from the central controller.

10. A method of using a vehicle camera cleaning system to clean a camera lens in the vehicle, the camera cleaning system comprising an air-emitting device arranged proximate to the camera lens, the an air-emitting device being configured to emit air onto the camera lens, a water drop sensor configured to generate water drop sensor information based on an amount of infrared rays received by the water drop sensor, the infrared rays being reflected the by the camera lens, and a processing device including one or more processors, the processing device being configured to implement the method, the method comprising:
  receiving water drop information from the water drop sensor;
  determining whether there are water drops on the camera lens based on the water drop information; and
  in response to determining there are water drops on the camera lens, generating an instruction to activate the dispersion device to remove the water drops.

11. The method of claim 10, wherein the vehicle camera cleaning system further comprises a foreign matter image sensor comprising a sensor camera, wherein the foreign matter image sensor is configured to generating foreign matter information indicating foreign matter being detected on the camera lens, and wherein the determination whether there are water drops on the camera lens is further based on the foreign matter information.

12. The method of claim 10, wherein the water drop sensor comprises a infrared receiver configured to receive the infrared rays and an infrared transmitter configured to transmit infrared rays, and wherein determining whether there are water drops on the camera lens comprises:
  comparing the amount of infrared rays received by the infrared receiver in comparison to the amount of the infrared rays emitted by the infrared emitter.

13. The method of claim 10, wherein detecting foreign matter on the camera lens, by the foreign matter image sensor, is based on a determination of whether a set of images captured by the sensor camera is continuous.

14. The method of claim 13, wherein the vehicle cleaning system further comprises a heater configured to heat a water flow, and a temperature sensor, the temperature sensor being configured to generate environment temperature information indicating an environment temperature of the camera lens, and wherein the method further comprises:
  Determining whether the environment temperature is lower than a threshold temperature value in response to receiving the environment temperate information; and
  Generating an activation instruction to activate the heater in response to determining the environment temperature is lower than a threshold temperature value.

* * * * *